July 30, 1963  W. F. SCHROEDER  3,099,159

TIDE INDICATOR

Filed July 13, 1961

INVENTOR.
*William F. Schroeder.*
BY *John Cyril Malloy*

ATTORNEY.

United States Patent Office
3,099,159
Patented July 30, 1963

3,099,159
TIDE INDICATOR
William F. Schroeder, Boca Raton, Fla.
Filed July 13, 1961, Ser. No. 123,729
5 Claims. (Cl. 73—322)

This invention relates to a tide indicator and, in particular, this invention relates to a tide indicator which will show the relative level of the tide at any given period of time with reference to the mean sea level.

In the past, there have been devices which measure and signal in response to the height of the water in irrigation ditches and which show the height of tides, but there has been no such devices which include an indicator responsive to changes in tides whereby it will indicate the relative height of the tide at any point in time and will also indicate whether the tide is ebbing or flowing.

Along the water front at piers and other boat facilities it is often required or preferred to know the level of the water before a trip is taken or plans made. The instant invention comprises a device which may be mounted at such facilities whereby an observer may see with a glance from a distance the level of the water and track its ebb or flow without the requirement of actually looking and studying the water to obtain this information.

It is accordingly an object of this invention to provide a device of the type described hereinafter which comprises as indicator which will track the relative height of the tide in relation to the sea level and be visible at a distance to an observer whereby the level of the tide can be seen without actually looking at the water.

It is another object of the instant invention to provide a device of the type described which, in addition to the level of the tide, will indicate its direction, ebb or flow.

It is also an object of this invention to provide a tide indicator which will be adaptable whereby it will cause a signal to be given at any predetermined tide level.

It is a general object of this invention to provide a novel tide indicator which is simple in construction, economical in cost and in manufacture, and efficient in operation.

In accordance with these and other objects which will become apparent hereinafter, the instant invention will now be described with reference to the accompanying drawings illustrating a preferred embodiment thereof.

Figure 1:
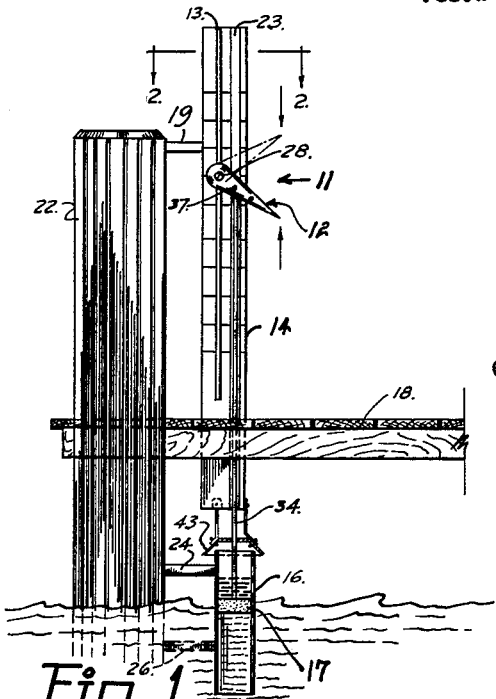
FIG. 1 is an elevation view of the instant invention.

Referring more particularly to the drawings, wherein like reference characters designate like or corresponding parts throughout the different views, and referring particularly to FIG. 1, 11 designates generally the tide indicator comprising an indicator 12 slideably mounted in a longitudinal slot 13 of the elongated gauge 14, which has affixed at one end thereof a housing 16 for a float 17, said housing being at least partially immersed in water, and means communicating between said float and said indicator. The tide indicator may be mounted to a pier 18 or other boat facilities whereby the relative level of the tide with reference to the mean sea level and the direction, ebb or flow, of the tide, may be readily ascertained by reference to the indicator 12.

Two embodiments of the instant invention are described hereinafter, the first with reference to FIGS. 1 and 2, the second with reference to FIGS. 3 and 4.

Referring to FIG. 1, the gauge 14 is rigidly mounted as at 19 to a pier support 22, said gauge being provided with the aforesaid slot 13 and a longitudinal channel 23. Disposed at one end of said elongated gauge 14, is the housing 16, which is rigidly mounted at 24 and 26 to said pier and partially immersed in water. A float 17 is free to bob up and down within the housing. Within the housing, a supply of oil 27 is provided, which, because it also floats on water, will not wash away, but will remain within the housing 16 keeping the interior walls thereof free from barnacles. The indicator 12 is pivotally mounted to said gauge 14 at a point designated 28 which is defined as the juncture of the indicator and a bolt 29. The bolt extends through the slot 13 and is provided with a leaf spring 31, disposed in an enlarged portion 32 of the slot, and a nut 33, whereby a force, which is applied to the indicator at a point 28 along a path which is parallel to the slot 13, will cause the indicator to travel up or down within the slot provided the force is sufficient to overcome the friction of the indicator 12 and spring 31 as they drag within the slot 13. Disposed within the channel 23, a rigid rod 34 is provided being attached at one end 36 thereof to said float 17 and at the other end thereof to said indicator, as at 37. The indicator 12 has a pin 38 projecting from the surface thereof adjacent said gauge disposed such that in the normal position it is in engagement with the edge 39 of the gauge, either at points 41 or 42 in FIG. 2 depending upon the direction of force being applied to said indicator. A hood 43 having a hole therein for said rod 34 may be provided to cover said housing, as is shown in FIG. 1 and FIG. 3.

In use, as the level of the water drops and rises in response to the ebb and flow of the tide, the float 17 will fall or rise exerting a tensional or compressive force on the rod 34, which will cause the indicator 12 to move down or up, and, because said rod 34 is mounted off center from point 28, the indicator will have applied thereto torque which will cause the indicator at all times, except at the extremes of its travel, to indicate the direction of the force, and, consequently, the direction of the tide.

Figure 2:
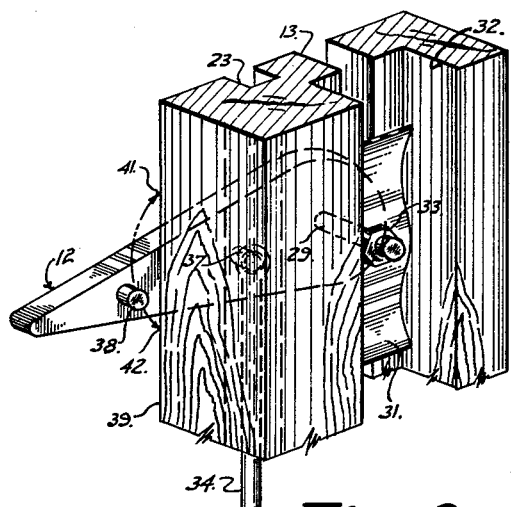
FIG. 2 is a partial pictorial view taken along line 2—2 of FIG. 1 and looking in the direction of the arrows.
Figure 3:
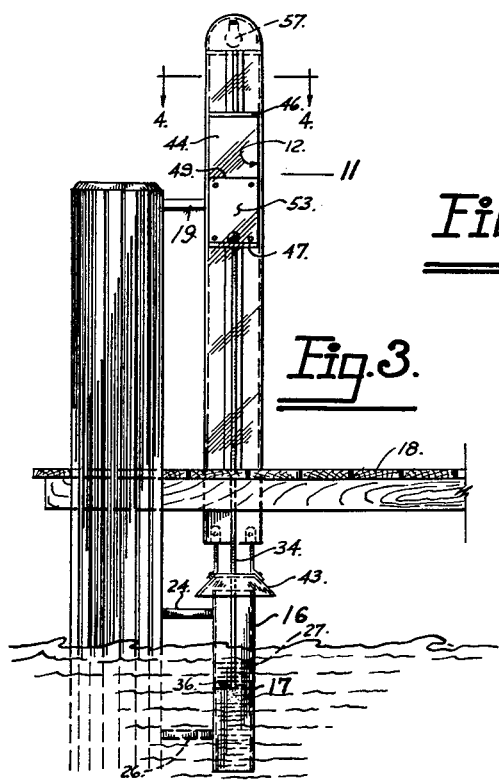
FIG. 3 is an alternative embodiment of the invention shown in FIG. 1.
Figure 4:
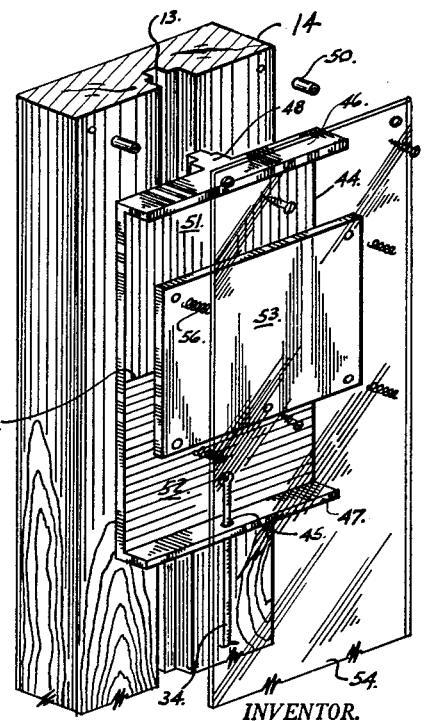
FIG. 4 is a partial exploded pictorial view taken substantially along line 4—4 of FIG. 3 and looking in the direction of the arrows.

Referring to FIG. 3 and FIG. 4, which show an alternative embodiment of the instant invention to that shown in FIG. 1 and FIG. 2, the indicator 12 comprises a first plate 44 having a top projection 46 and a bottom projection 47, said first plate being provided with a longitudinal tongue 48 for slideable travel in said slot 13, said first plate 44 having a mid-line 49 dividing the area thereof between said projections into two areas 51 and 52 of contrasting colors, and a second plate 53 disposed between said projections 46 and 47 and being substantially equal in area to each of said contrasting color areas of said first plate. The rod 34 is affixed to the float 17 at one end thereof and at the other end to the second plate 53, said rod extending through a hole 45 in the bottom projection 47. A transparent cover 54 is provided over the tips of the projections 46 and 47 and spacers 50 are provided as required. The transparent cover 54 may be provided with sides, not shown, and the second plate is provided with recesses for receiving spring type pads 56 to keep it in proper alignment with said hole 45. In lieu of the pads 56, projections, such as 46 and 47, on the first plate will suffice to maintain proper alignment.

In use, as the float 17 decends or rises, the rod 34 will pull or push the second plate 53 into engagement with the bottom projection 47 or the top projection 46, covering one of the colored areas 52 or 51, and thereafter further movement of the float will, through force transmitted through the second plate in engagement with either the bottom or top projection, cause the first plate to move downwardly or upwardly as the tongue 48 travels in the slot 13. The color of the area of the first plate will signal the direction of the tide, and the location of the first plate relative to the gauge will indicate the level of said tide. A light source 57 may be provided to shed light upon the plates whereby the indicator will be visible in the night.

The indicator may also comprise an electrical switch which, when upon reaching a certain level on the gauge, will permit a current to flow energizing a bell or similar noise-making device, whereby attention may be called to a particular tide level.

At locations where the tide may vary greatly any number of reducing devices may be employed to bring the travel of the indicator within the range acceptable for a pier mounted tide indicator.

While the instant invention has been shown and described herein in what is conceived to be the most practical and preferred embodiment, it is recogized that departures may be made therefrom within the scope of the invention, which is therefore not to be limited to the details disclosed herein but is to be accorded the full scope of the claims so as to embrace any and all equivalent apparatus and articles.

What is claimed is:

1. In a tidal height and direction of flow indicator, a support, a first member mounted on said support for frictional sliding relatively thereto, a second member carried by said first member for limited movement with respect thereto, a housing fixed with said support in vertically-spaced relation below said members, and having open upper and lower ends, a float positioned within said housing for free vertical guided translation therein, a rod having its lower end fixed to said float and its upper end connected to said second member only, vertical translation of said float in and relatively to said housing first moving said second member relatively to said first member to thereby indicate the direction of tide flow, continued translation of said float in the same direction relatively to said housing moving said members as a unit to thereby indicate instantaneous height of tide.

2. The indicator of claim 1, said second member comprising a pointer mounted on said first member for pivotal movement relatively thereto about a first axis, said rod being pivotally connected to said second member on an axis parallel with and laterally offset from said first axis, and means limiting pivotal movement of said second member on and relatively to said first member.

3. The indicator of claim 1, said first member comprising a first plate mounted on said support for frictional guided vertical translation relatively thereto, said second member comprising a second plate mounted on said first plate for guided vertical translation on and relatively to said first plate, means for limiting translation of said second plate on and relatively to said first plate, to cover and uncover discrete areas of said first plate, said areas being marked to visually indicate rising and falling tides, respectively.

4. The indicator of claim 3, said last-named means comprising normally horizontally disposed, vertically-spaced upper and lower flanges extending outwardly in the same direction from said first plate, said second plate being mounted on said first plate between said flanges for engagement therewith in its limiting upper and lower positions, respectively, and a transparent cover secured to said flanges and enclosing said second plate for visual inspection therethrough.

5. The indicator of claim 1, said housing being mounted on said support with its upper and lower ends above and below the surface of a body of tidal water, and a body of oil confined in said housing above said float.

References Cited in the file of this patent

UNITED STATES PATENTS

| 1,008,446 | Butts | Nov. 14, 1911 |
| 2,939,125 | Swanson | May 31, 1960 |